United States Patent [19]

Gerstorfer

[11] Patent Number: 4,728,196
[45] Date of Patent: Mar. 1, 1988

[54] ARRANGEMENT FOR DETERMINING A SURFACE STRUCTURE, ESPECIALLY FOR ROUGHNESS

[75] Inventor: Oskar Gerstorfer, Dachau, Fed. Rep. of Germany

[73] Assignee: Optische Werke G. Rodenstock, Munich, Fed. Rep. of Germany

[21] Appl. No.: 578,499

[22] Filed: Feb. 9, 1984

[30] Foreign Application Priority Data

Feb. 11, 1983 [DE] Fed. Rep. of Germany ....... 3304780

[51] Int. Cl.⁴ ............................................. G01B 11/30
[52] U.S. Cl. ............................................. 356/446
[58] Field of Search ............... 356/446, 445, 447, 369, 356/237, 71, 239, 448, 343; 250/203 DF; 350/6.4, 527, 523

[56] References Cited

U.S. PATENT DOCUMENTS

| | | | |
|---|---|---|---|
| 3,016,464 | 1/1962 | Bailey | 356/448 X |
| 3,647,961 | 3/1972 | Blitchington et al. | 350/6.4 X |
| 3,790,287 | 2/1974 | Cuthbert et al. | 356/446 |
| 3,850,526 | 11/1974 | Corey, III | 356/445 X |
| 3,857,637 | 12/1974 | Obenreder | 356/237 X |
| 4,180,830 | 12/1979 | Roach | 356/237 X |
| 4,204,772 | 5/1980 | Balasubramanian | 356/376 |
| 4,226,541 | 10/1980 | Tisue | 356/446 |
| 4,283,146 | 8/1981 | Roussel | 356/445 |
| 4,412,746 | 11/1983 | Yokouchi | 356/446 |
| 4,453,239 | 6/1984 | Musha et al. | 250/201 DF X |
| 4,464,050 | 8/1984 | Kato et al. | 356/446 |

FOREIGN PATENT DOCUMENTS

| | | | |
|---|---|---|---|
| 2222917 | 3/1973 | France | 356/445 |
| 1095036 | 5/1984 | U.S.S.R. | 356/376 |

*Primary Examiner*—R. A. Rosenberger
*Attorney, Agent, or Firm*—Barnes & Thornburg

[57] ABSTRACT

An arrangement for determining the surface structure and especially the roughness of a specimen which includes an image lens system that focuses a parallel ray onto the surface to be examined with an inclined incidence direction and a lens system which reproduces the reflected light beam on a detector array. The distance of the detector array is approximately equal to the focal distance of the lens system. The distance of the surface from the lens systems is also approximately equal to the focal distance of the lens systems. The arrangement according to the invention offers the advantage that also with an areal specimen illumination as well as with greater changes of the distance between the arrangement and the surface to be examined, an unequivocal coordination exists between the angle, under which the light is reflected, and the individual detector elements.

23 Claims, 4 Drawing Figures

ARRANGEMENT FOR DETERMINING A SURFACE STRUCTURE, ESPECIALLY FOR ROUGHNESS

The present invention relates to an installation for determining a surface structure, especially the roughness, in which the angular dependence of the reflected light for angles around the reflection angle of the ideal surface is measured by means of a light detector array and the surface structure is determined therefrom by an evaluation circuit.

An arrangement of this type is known from the German Offenlegungsschrift No. 28 20 910. In this prior art arrangement, a laser beam is directed at an inclination onto the surface to be examined. The angular distribution of the reflected light for angles around the reflection angle of the ideal surface is measured by means of a diode line or a diode field and the surface structure is determined from the angle distribution. It is disadvantageous with this prior art arrangement that the coordination between the light scattered in a predetermined space angle and the individual diodes of the diode array depends in a very sensitive manner upon the distance of the arrangement to the surface to be examined as well as on the size of the light spot on the surface. On the other hand, depending on the laser type, used intensity problems result, especially if the surface is to be examined by means of a very small "light spot."

An arrangement of another type is described in the German Offenlegungsschrift No. 30 37 622. In this arrangement, a parallel light beam with small cross section is directed perpendicularly onto the surface to be examined and the angle distribution of the reflected light is measured by means of a diode line. By reason of the perpendicular incidence, the light beam is reflected back essentially onto itself; it is therefore necessary to provide a light or beam splitter in the beam path. Since both the impinging light ray and also the reflected light beam pass through the beam splitter, respectively, and are deflected thereby, the utilizable intensity is reduced altogether to about one-fourth. Intensity problems result therefrom especially with critical surface structures. Moreover, with this known arrangement of another type, the coordination between the light reflected in a certain space angle and the individual diodes of the diode array also depends in a sensitive manner upon the distance of the arrangement from the surface to be examined.

The present invention is therefore concerned with the task to so further develop an arrangement of the type described hereinabove that the distance between the surface to be examined and the arrangement for detecting the surface structure can be varied within wide limits without the danger of loss of the coordination between the light reflected within a certain space angle and the individual measurement elements.

The underlying problems are solved according to the present invention in that an image lens system, whose distance from the surface to be examined is approximately equal to the focal distance of the image lens system, focuses a parallel light beam onto the surface to be examined, that the axis of the focused light beams subtends an angle with respect to the perpendicular to the surface which is other than zero, and in that a lens system images or reproduces the light beam reflected from the surface on a detector array whose distance from the lens system is approximately equal to the focal distance of the lens system. Since the light detector array is arranged in the focal plane of the lens system that reproduces the light beam reflected from the surface on the detector array, the coordination between the light reflected under a predetermined angle and the individual measuring elements of the detector array remains preserved extensively also with greater distance variations. It has been found in tests that the distance between the arrangement and the surface to be examined can be varied by about ±30% without influencing the determination of the surface structure and especially of the roughness thereof.

The arrangement according to the present invention offers a number of further advantages: No beam splitter is required owing to the inclined incidence of the light beam onto the surface, which would reduce the intensity of the light. Additionally, a high intensity is obtained by the focusing of a parallel light beam onto the surface even with a small "examination spot" (light spot). Furthermore, the coordination between the light that is reflected under a certain angle from the individual points of the light spot and the individual measurement elements of the light detector array remains preserved also with larger light spot diameters. This is due to the fact that the detector array is located in the focal plane of the lens system, otherwise stated, that the lens system and the detector array form a Fourier system.

The use of a common lens system for the incident and the reflected beam in accordance with the present invention leads to a simpler construction of the arrangement.

Of course, it is also possible with the arrangement according to the present invention to use any desired, known light detector arrangements and measuring elements for measuring the angle distribution of the reflected light. For example, the detector array may be a measurement field. If, however, for example, by reason of the treatment, machining or working method of the surface, the characteristics of the roughness are to be expected predominantly only in one direction, it is advantageous to use a line-shaped arrangement of light detectors, respectively, of measuring elements.

Any known suitable light-sensitive elements or light-receivers may be used as measuring elements which are able to convert the impinging light into an electric signal, such as for example, phototransistors, photodiodes, CdS cells or the like. It is particularly advantageous to utilize a commercial photodiode line as a detector array.

It is also possible to detect an areal scattered light distribution by means of a line-configured arrangement of measuring elements if the reflected light beam is rotated on the line-shaped arrangement of measuring elements. In this manner the areal scattered light distribution is interrogated or sensed in line-configured in timed sequence.

As already mentioned hereinabove, the arrangement of the present invention entails the advantage that—independent of the size of the light spot—rays emanating from any dots of the light spot under the same angle impinge on the same measuring element of the detector array. It is thus possible without difficulty to match the size of the light spot, respectively, of the examining spot to the corresponding measurement goal. A small light spot will be selected for an accurate examination whereas a light spot with large diameter is advantageous for an overall measurement. A particularly simple possibility for changing the size (diameter) of the light spot is possible in accordance with the present invention if a light source and a collimator produce a parallel light beam and the relationship of the focal distances of the collimator and of the image lens system and/or the type of the light source are variable for changing the size of the light spot on the surface to be examined.

These and other objects, features and advantages of the present invention will become more apparent from the following description when taken in connection with the accompanying drawing which shows, for purposes of illustration only, several embodiments in accordance with the present invention, and wherein.

Figure 1:
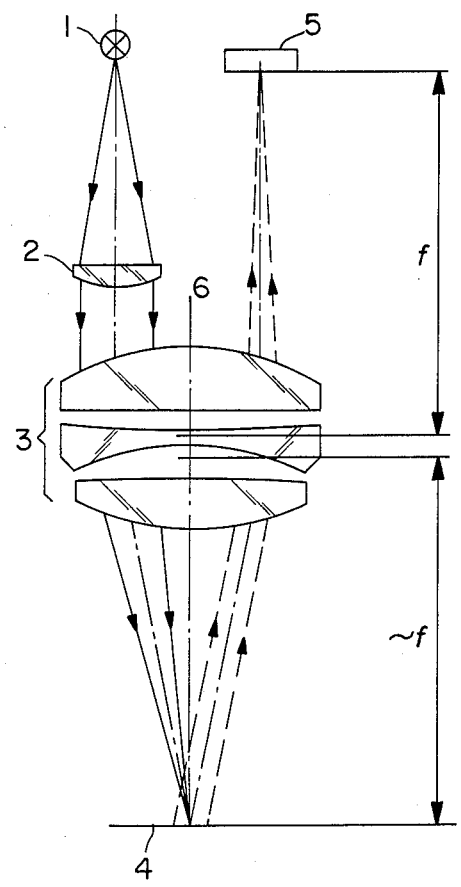
FIG. 1 is a somewhat schematic cross-sectional view through one embodiment of an arrangement in accordance with the present invention.

Referring now to the drawings wherein like reference numerals are used throughout the various views to designate like parts, and more particularly to FIG. 1, this figure illustrates an arrangement in accordance with the present invention for determining the surface structure and especially the roughness. The installation, illustrated only schematically, includes a light source 1, a collimator 2, a measuring objective or lens system 3' and a diode line 5.

A surface 4 to be examined has a spacing from the arrangement, i.e., from the forward main plane of the measuring objective or lens 3', which is approximately equal to the focal distance f of the measuring objective or lens 3.

The light emitted by the light source 1 is rendered parallel by the collimator 2 and falls on the measurement objective or lens system 3 laterally of the optical axis 6 of the measurement lens 3. The parallel light beam is focused by the measurement lens 3 on the specimen surface 4. In case of non-scattering specimens such as optical mirrors, the "diverging" reflected light beam from surface 4 also passes through the measurement lens 3 and is made parallel thereby. The parallel light beam then impinges on the diode line 5 which is located in the rear focal plane of the measurement lens 3. In case of scattering specimens, light rays or beams scattered under the same angle are focused onto a location on the diode line 5 unequivocally coordinated to this angle. Since the diode line 5 is located in the focal plane of the measurement lens 3, the coordination between the light reflected under a certain angle (space angle) and the individual diodes of the diode line 5 practically does not change with larger changes of the distances "measuring lens 3/specimen surface 4." Stated in other words, the measuring lens 3 and the diode line 5 form a Fourier system. It has been found in practice that distance changes of up to ±30% have no significant influence on the detection of the surface structure. It is additionally achieved, by the arrangement of the diode line 5 in the focal plane of the measurement lens 3, that all light rays emitted from the different points of the measurement spot under the same angle impinge on the same diode of the diode line 5.

Figure 2:
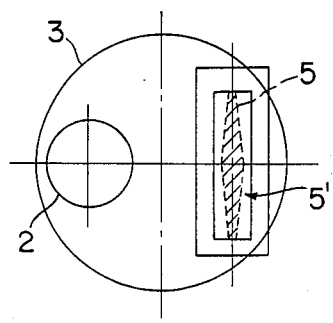
FIG. 2 is a somewhat schematic plan view on an arrangement in accordance with the present invention.

FIG. 2 illustrates a plan view of an arrangement according to the present invention wherein the same reference numerals are used. The distribution of the reflected light is schematically indicated at 5' on the diode line 5.

Figure 3:
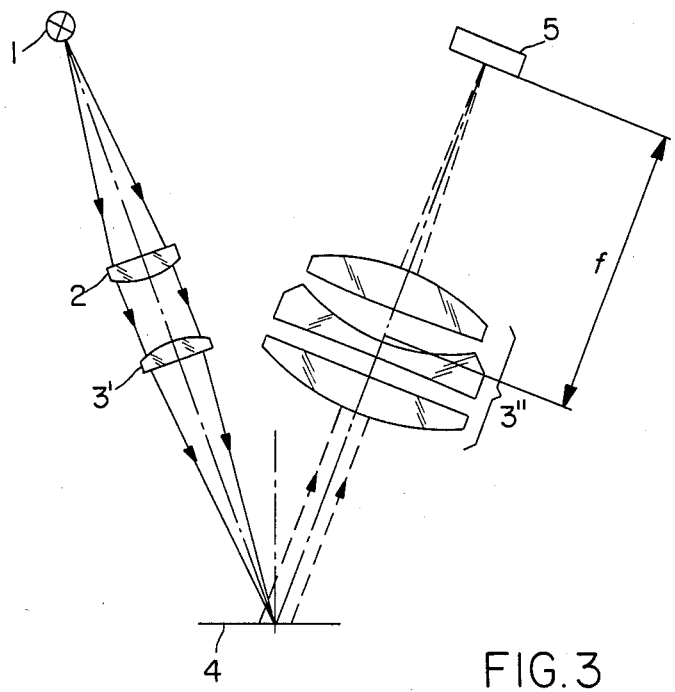
FIG. 3 is a somewhat schematic cross-sectional view through a modified embodiment of an arrangement in accordance with the present invention.

FIG. 3 illustrates a further embodiment of in arrangement according to the present invention. In lieu of the common measurement lens 3 of the arrangement according to FIGS. 1 and 2, two objective or lens systems 3' and 3" are used in this embodiment. The lens 3' focuses the parallel light beam which emanates from the collimator 2, onto the specimen surface 4 whereas the lens 3" images or reproduces the reflected light beam from the surface 4 on the diode line 5. Otherwise, the construction of the embodiment of FIG. 3 is similar to the construction of the embodiment illustrated in FIGS. 1 and 2.

Figure 4:
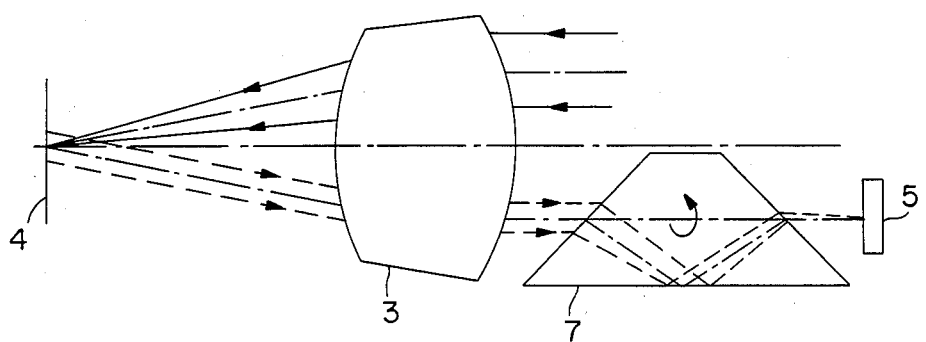
FIG. 4 is a somewhat schematic view of an optical rotating system for use with the present invention.

A further embodiment of the arrangement according to the present invention is illustrated in FIG. 4. In this embodiment, a known Dove-prism 7 is interposed in the beam passage between the measurement lens 3, respectively, the lens 3" and the diode line 5. If one rotates the Dove-prism 7, then it is possible to interrogate, or sense, line-configured, in timed sequence, an areal scattered light distribution. Furthermore, also Schmidt-Pechan prisms or the like may be used.

In one practical realization of the embodiment illustrated in FIGS. 1-4, the measurement objective or lens 3, respectively, the objectives or lenses 3' and 3" have a focal distance of about 25 mm. The diode line 5 includes twenty measurement points, respectively, diodes with a length of about 20 mm. The axis of the focused beam which impinges on the specimen surface 4, subtends an angle of about 20° with the surface perpendicular of the (ideal) surface.

The light spot diameter is typically 2 mm. However, the special properties of the arrangement according to the present invention—the strict coordination between reflection angle and measurement element (diode) of the diode line—enables a variation of the light spot diameter within wide limits. For example, by changing the focal distance of the collimator from 5 mm. to 30 mm. and/or the type of light source 1, the light spot diameter can be varied between 5 $\mu$m and 4 mm, so that also the smallest measurement objects can be detected. This is made possible by the telecentric beam passage between the collimator 2 and the measurement objective 3, respectively, 3'. Laser diodes, light diodes, incandescent lamps or the like can be used as light sources 1. It is also possible to replace the light source 1 and the collimator 2 by a laser. Of course, also light outside of the visible spectrum may be used with the present invention. Furthermore, the diode line 5 illustrated in the various embodiments can be replaced by a detector field, for example, by a diode field or a phototransistor field. Such a light detector field permits the immediate determination of an areal scattered light distribution. Further, it is possible with the use of a line-configured detector arrangement to rotate the same for the determination of the areal scattered light distribution.

Independently of the particular embodiment, the arrangement of the present invention offers the advantage that an unequivocal coordination between scattering angle and imaging on the diode line exists also in case of an areal specimen illumination. Furthermore, the use of a beam splitter is unnecessary by reason of the inclined incidence on the specimen surface, whence an intensity gain by a factor of 4 results. Finally, a compact construction of the arrangement is possible by the arrangement according to the present invention and possibly by the use of a common objective or lens for the image on the specimen surface and the image on the detector array.

These advantages of the arrangement according to the present invention opens up greater possibilities than the known arrangements of the prior art, to determine from the output signals of the measurement elements characteristic magnitudes for the surface structure and especially for the roughness so that practically all known evaluation methods can be used for the output signals of the array. It is possible in particular without any difficulty to utilize an evaluation circuit which supplies integral characteristic values as are described, for example, in the German Offenlegungschrift No. 30 37 622 or in the German Offenlegungsschrift No. 23 56 535. It is disclosed, for example, in the German Offenlegungsschrift No. 30 37 622 that the evaluation circuit determines from the output signals of the measurement elements the roughness of the surface according to the equations:

$$S_x = \sum_{i=1}^{n} |w_i - \overline{w}|^x \cdot P_i, \text{ where } x = 1 \text{ or } 2 \quad (a)$$

$$\overline{w} = \sum_{i=1}^{n} w_i \cdot P_i \quad (b)$$

$$P_i = \frac{D_i \cdot g_i}{\sum_{i=1}^{n} D_i \cdot g_i} \quad (c)$$

whereby $w_1$ is the angle of the scattered light beam detected by the respective measuring element, n is the number of the detectors used for the evaluation, $\overline{w}$ is the average value from the value $P_i$ and $w_i$, $P_i$ is the measurement signal $D_i$ defined according to the equation (c), and $g_i$ are correcting factors for the measurement signal $D_i$.

While I have shown and described several embodiments in accordance with the present invention, it is understood that the same is not limited thereto but is susceptible of numerous changes and modifications as known to those skilled in the art, and I therefore do not wish to be limited on the details shown and described herein but intend to cover all such changes and modifications as are encompassed by the scope of the appended claims.

I claim:

1. An arrangement for determining at least a surface structure of a specimen in which angular dependence of radiant energy reflected from said surface structure for angles about a reflection angle of an ideal surface is measured, comprising
    a detector array means comprised of a plurality of individual detectors sensing radiant energy received from said surface structure for producing output signals,
    first lens means
    having a focal distance and whose distance from said surface structure of the specimen is approximately equal to said focal distance of said first lens means
    for focusing a substantially parallel radiant energy beam received from a radiant energy source onto said specimen in such a manner that an axis of the said focussed light beam subtends an angle not equal to zero with respect to a line substantially perpendicular to said surface structure of the specimen,
    second lens means receiving radiant energy at multiple angles of reflection from said surface structure and having a focal distance substantially equal to the distance between said second lens means and said detector array means and, for plural angles of said multiple angles of reflection imaging at a predetermined location on the radiant energy detector array means radiant energy reflected from said surface structure at a given angle of reflection, and
    an evaluator circuit responsive to said output signals from said individual detectors for calculating measurement elements for roughness of the surface structure.

2. An arrangement according to claim 1, wherein said first lens means and said second lens means comprise
    an integral lens system operable to focus said substantially parallel radiant energy beam onto said surface structure of the specimen and the reflected radiant energy beam onto the radiant energy detector array means.

3. An arrangement according to claim 2, wherein the detector array means comprises
    a line-configured arrangement of radiant energy detection means.

4. An arrangement according to claim 3, wherein the radiant energy detection means are photodiodes.

5. An arrangement according to claim 14, further comprising
    means for rotating during measurements the line-configured arrangement of radiant energy detection means with respect to said radiant energy, reflected from said surface structure.

6. An arrangement according to claim 4, further comprising
    an optical rotating means for rotating said radiant energy reflected from said surface structure with respect to the radiant energy detection means.

7. An arrangement according to claim 1, wherein the detector array means comprises
    a line-configured arrangement of radiant energy detection means.

8. An arrangement according to claim 7, further comprising
    means for rotating during measurements the line-configured arrangement of radiant energy detection means with respect to said radiant energy reflected from said surface structure.

9. An arrangement according to claim 7, further comprising
    an optical rotating means for rotating said radiant energy reflected from said surface structure with respect to the radiant energy detection means.

10. An arrangement according to claim 9, wherein said optical rotating means includes prism means.

11. An arrangement according to claim 10, wherein the radiant energy detection means are photodiodes.

12. An arrangement according to claim 7, wherein said first lens means comprises
    a collimator receiving radiant energy from said source to transmit a substantially parallel radiant energy beam to be focussed on said surface structure, and wherein the relationship of the focal distances of the collimator and at least one of said first and second lens means are variable for changing the size of the radiant energy spot on said surface structure of said specimen.

13. An arrangement according to claim 7, further comprising
a collimator receiving radiant energy from said source to transmit a substantially parallel radiant energy beam,
means for focussing the parallel radiant energy beam on said surface structure, and wherein distance between the collimator and the radiant energy source is variable for changing the size of the radiant energy spot on said surface of the specimen to be examined.

14. An arrangement according to claim 1, wherein the detector array means comprises photodiodes.

15. An arrangement according to claim 14, further comprising
means for rotating during measurements the line-configured arrangement of radiant energy detection means with respect to said radiant energy reflected from said surface structure.

16. An arrangement according to claim 1, further comprising
means comprising a collimator for receiving radiant energy to produce a substantially parallel radiant energy beam to said surface structure, and wherein the relationship of the focal distances of the collimator and at least one of said first and second lens means are variable for changing the size of the light spot on said surface structure of said specimen.

17. An arrangement according to claim 1, further comprising
a collimator receiving radiant energy from said source to transmit a substantially parallel radiant energy beam to said surface structure, and wherein the distance between the collimator and the radiant energy source is variable for changing the size of the radiant energy spot on said surface of the specimen to be examined.

18. An arrangement in accordance with claim 1, wherein
said plurality of detectors are disposed in plural rows as an array, each of the rows respectively having an axis,
the axes of the rows being disposed substantially orthogonally with respect to a line connecting substantially a center of the array and an optical axis of said second lens means.

19. An arrangenent in accordance with claim 1, wherein
the evaluation circuit determines from the output signals of the individual detectors the roughness of the surface according to the equations:

$$S_x = \sum_{i=1}^{n} |w_i - \overline{w}|^x \cdot P_i, \text{ where } x = 1 \text{ or } 2 \quad (a)$$

$$\overline{w} = \sum_{i=1}^{n} w_i \cdot P_i \quad (b)$$

$$P_i = \frac{D_i \cdot g_i}{\sum_{i=1}^{n} D_i \cdot g_i} \quad (c)$$

whereby
$w_i$ is the angle of the scattered beam detected by the respective measuring element,
n is the number of the detectors used for the evaluation,
$\overline{w}$ is the average value from the value $P_I$ and $w_i$,
$P_i$ is the measurement signal $D_i$ defined according to the equation (c), and
$g_i$ are correcting factors for the measurement signal $D_i$.

20. Apparatus for determining a surface structure of a surface comprising
a radiant energy source means for transmitting parallel rays of energy,
a lens means having a first focal distance facing said surface structure and focussing said transmitted energy on said surface structure, an axis of said focussed energy being at an angle not equal to zero with respect to a line substantially perpendicular to said surface structure,
a radiant energy detector array means organized of a plurality of individual detectors for receiving radiant energy reflected at plural angles of reflection to image energy reflected from said surface structure for a given angle of reflection at substantially a same location on said radiant energy detector array means for producing output signals,
means for projecting the radiant energy reflected from the surface structure of a given angle of deflection onto a predetermined location of the radiant energy detector array substantially independent of the distance of the surface, and
an evaluator circuit resposive to said output signals from said individual detectors for calculating measurement elements for roughness of the surface structure.

21. Apparatus in accordance with claim 20, wherein said lens means comprises
a first lens focusing only energy received from said radiant energy source means on said surface, and wherein said projecting means comprises
a second lens means imaging only energy reflected from said surface structure on said radiant energy detector array means.

22. Apparatus in accordance with claim 20, wherein said radiant energy detector array means comprises
a plurality of individual detection means disposed linearly,
a first of said individual detection means receiving energy reflected at said principle angle and
at least one of said remaining individual detection means receiving energy reflected at said angle of reflection other than said principle angle of reflection.

23. Apparatus in accordance with claim 20, wherein the radiant energy detector array means
provides a determination of an areal scattered light distribution.

* * * * *